Patented July 13, 1937

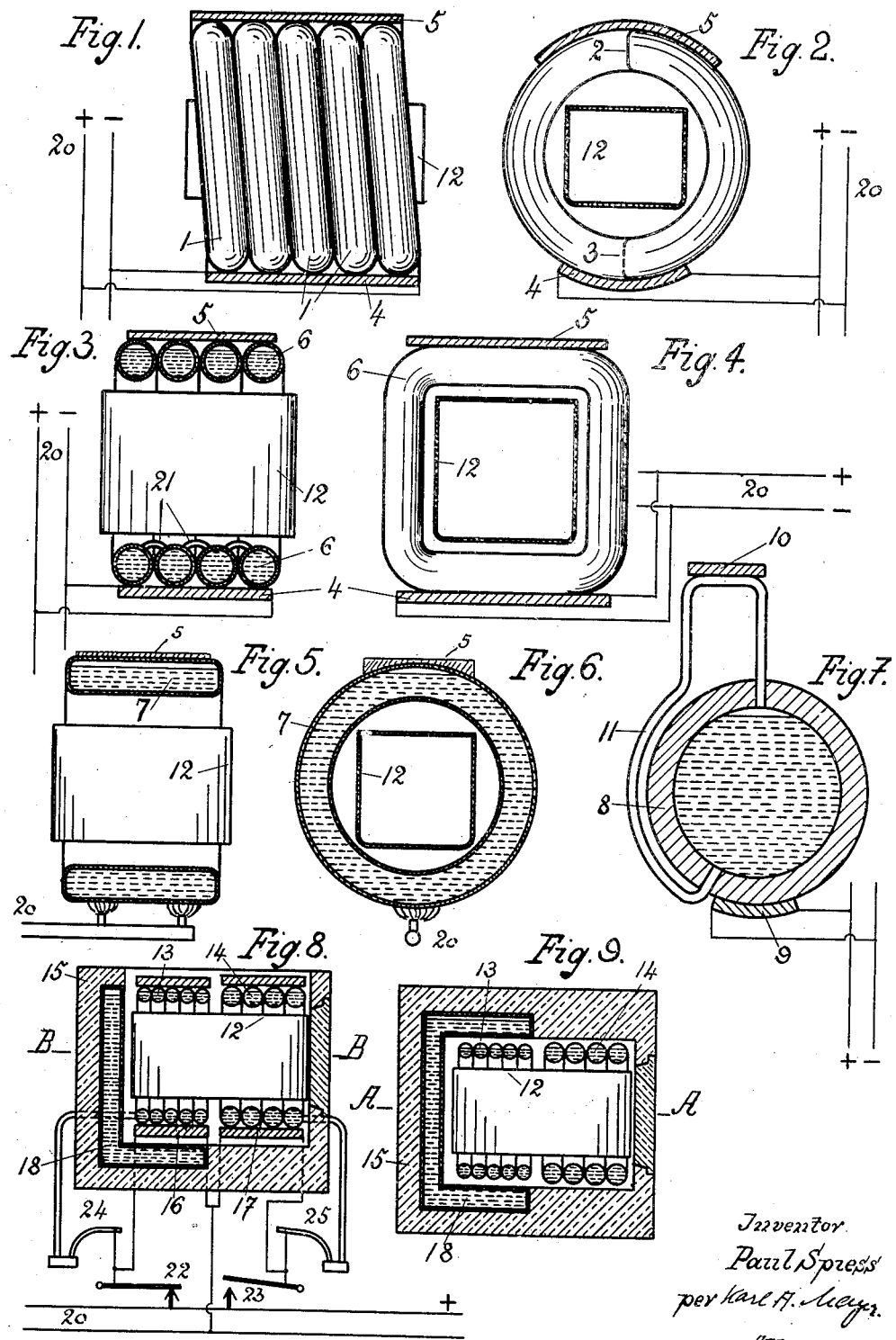

2,087,050

UNITED STATES PATENT OFFICE 2,087,050

COOKING MACHINE

Paul Spiess, Zollikon-Zurich, Switzerland

Application July 21, 1933, Serial No. 681,517
In Switzerland August 1, 1932

11 Claims. (Cl. 219—35)

This invention relates to the design of a heat storage apparatus more particularly a heat storage apparatus in connection with cooking stoves and ovens.

An object of this invention resides in the provision of a heat storage apparatus in connection with cooking ovens whereby a substance having very great heat storage capacity per volume and weight unit for example water can be used effectively as a storage medium.

An object of this invention resides in the provision of a heat storage apparatus in connection with cooking ovens whereby great heat storage capacity is obtained in an apparatus of small space requirements and small weight.

An object of this invention resides in the provision of a heat storage apparatus in connection with cooking ovens whereby great heat storage capacity is obtained in an apparatus having small over all dimensions and therefore small radiation losses and requiring only a small amount of insulating material.

An object of this invention resides in the provision of a heat storage apparatus in connection with cooking ovens wherein best heat transfer conditions from a source of heat to a heat storage medium and therefrom to the matters to be cooked or treated are obtained.

An object of this invention resides in the provision of a heat storage apparatus in connection with cooking ovens whereby best heat transmitting conditions are obtained from a heat storage medium to the material to be heated by using this medium at this point in an evaporated and condensing state and at the same time greatest heat storage capacity is obtained by maintaining the greatest possible amount of the storage medium for the latter purpose in a liquid state.

An object of this invention resides in the provision of a heat storage apparatus in connection with cooking ovens whereby any corrosion, wear, using up or decomposition of the heat storage medium is entirely eliminated.

An object of this invention resides in the provision of a heat storage apparatus in connection with cooking ovens or the like wherein the difference of the temperature of the fully loaded heat storage apparatus and the temperature of the unloaded heat storage apparatus is small and the upper temperature i. e. the temperature of full load condition is comparatively low.

An object of this invention resides in the provision of a heat storage apparatus for cooking ovens and the like using a fluid enclosed in a vessel as heat storing medium whereby any loss of the storage medium is definitely prevented.

An object of this invention resides in the provision of a heat storage apparatus in connection with cooking ovens whereby a heat storage medium which is partly in a liquid and partly in an evaporated state is enclosed in a container of such configuration which secures best circulating conditions of said medium and best conveying conditions for the heat from a source of heat to the point of using the heat for cooking or other purposes.

Further and other objects of the present invention will be hereinafter set forth in the accompanying specification and claims and shown in the drawing which, by way of illustration, shows what I now consider to be a preferred embodiment of my invention.

In the drawing:

Fig. 1 is a front view of an apparatus according to my invention.

Fig. 2 is a diagrammatic end view of the apparatus shown in Fig. 1.

Fig. 3 is a diagrammatic longitudinal section through an apparatus according to my invention.

Fig. 4 is a diagrammatic end view of an embodiment of my invention as shown in Fig. 3.

Fig. 5 is a diagrammatic longitudinal section through an apparatus according to my invention.

Fig. 6 is a diagrammatic transverse section through an embodiment of my invention according to Fig. 5.

Fig. 7 is a diagrammatic cross section through another variety of cooking machine according to my invention.

Fig. 8 is a diagrammatic longitudinal vertical cross section through a cooking machine according to my invention taken along line 8—8 of Fig. 9 and having three individual heat accumulators.

Fig. 9 is a horizontal longitudinal cross section through a cooking machine according to my invention as per Fig. 8 and taken along line 9—9 in Fig. 8.

In the embodiment of my invention according to Figs. 1 and 2 the storage vessel consists of a closed tube coil with horizontal axis, whereby the individual coils 1 are in a substantially vertical position and are in close heat conducting contact with one another. The ends 2 and 3 of the coil are tightly and permanently closed definitely preventing any leakage of the heat storage fluid contained within the coil. The plate 4 illustrates in a diagrammatic way a source of heat which may for example consist of suitably arranged electric resistance wires fed from an electric main 20. I might just as well use another source of heat for example small gas burners etc. It must be noted that this source of heat is arranged at the lowermost point of the storage vessel. The withdrawal of the heat for example for cooking purposes takes place at the uppermost point of the storage vessel and may be carried out for example by a plate 5 which is in intimate heat conducting contact with the vessel, or the cooking utensils may be placed directly on the heat storage vessel. This arrangement secures an active circulation of the heat storage fluid within the coil the heated fluid rising upwards and the cooled fluid, after it has given up its heat wholly or partly to the plate 5 and the cooking utensils, descending again towards the source of heat 4.

The configuration of the heat storage vessel is such that there is a minimum of resistance against the circulation of the heat storage fluid and that there is a rapid exchange of heat at the point of heat supply and at the point of withdrawal of the heat which is essential when using the apparatus for cooking purposes. The design of the embodiments of my invention as disclosed in Figs. 1-9 are based on the same principle.

In the embodiment of my invention according to Figs. 3 and 4 closed individual tube rings 6 are provided which may have a circular shape or be angular as shown in Fig. 4. The vessel containing the heat accumulating fluid is subdivided into several adjacent containers which may be interconnected by small equalizing conduits 21 in order to secure equal temperature and pressure conditions within all individual containers. The individual vessels are preferably made of seamless steel tubes thereby reducing the weight of the vessels. In Fig. 3 for example four individual tubular storage elements are arranged adjacent to one another. The source of heat is on the lowermost part and the point of withdrawal of the heat at the uppermost part of the elements. The circulation of the fluid is rapid as is the case in the design shown in Figs. 1 and 2 and so is the reception of the heat and its transmission to the cooking plate 5. By using a greater or lesser number of individual rings the storage capacity can be increased or reduced and the device be built at small manufacturing cost for any desired heat storage capacity.

In Figs. 5 and 6 another embodiment of my invention is shown wherein the storage vessel consists of a closed hollow cylinder 7 containing the heat accumulating liquid. This design is particularly applicable to apparatuses wherein the accumulation of heat is carried out at lower temperatures and pressures. In Figs. 5 and 6 a small gas burner is shown for heating the vessel. The apparatus can equally well be operated with another source of heat.

The design of the accumulator vessel according to Figs. 1-6 lends itself automatically to the efficient provision of a baking oven as is desired in kitchen stoves; with this type of an arrangement also the surface which must be insulated and the loss of heat is small which is of particular importance when the accumulator is electrically heated and loaded with cheap electric energy as is available during the night from water power plants or during the hours of low load from steam power plants.

Another embodiment of my invention is disclosed in Fig. 7. A hollow ball-like vessel 8 is used as accumulator. The source of heat 9 is connected to the lowest point of the ball. A conduit 11 is connected to the upper part of the vessel conveying the hot heat storage fluid to a cooking plate 10 or the like remote from the vessel 8 and carrying the fluid, after it has given up part or all of its heat, back to the vessel 8 in a descending conduit 7 which is connected to the lower part of the vessel. A plurality of conduits may be connected to the vessel for the supply of one or more cooking plates or the like. The points of using the heat are preferably at the uppermost part of the conduit. The heat storage vessel as required for an embodiment of my invention as per Fig. 7 is preferably made of cast steel. A vessel having the shape of a hollow ball or the like has smallest outside contours also for large amounts of heat storage fluid, requires little insulation and has only small radiation losses. Instead of the ball form of the vessel a short cylinder with vertical axis and having hemispherical ends may be chosen.

From a kitchen stove or cooking machine high temperatures are demanded for example for frying purposes and low temperatures for slow cooking and it is therefore advisable to use at least two groups of heat accumulators, one group for storing at high temperatures and the other group or consecutive groups operating at lower temperatures. In this way the desired variety of temperatures for the individual cooking operations can be obtained; fast baking, boiling or frying can be done on an accumulator stage having high temperature and slow cooking at a stage operating at lower temperatures. The heat losses are reduced when storing at several pressure or/and temperature stages because only part of the accumulator operates at high temperature. Otherwise it would be necessary to operate the whole accumulator at the highest required temperature and the whole vessel would have to be insulated for this high temperature, whereas when the heat is accumulated in several temperature stages the amount of lagging required is much smaller and so are the heat losses. There is also a saving in weight and space requirement of the storage vessel or vessels inasmuch as only the one for supplying the high temperatures must be built for such temperatures and to withstand the correspondingly high internal pressure, whereas the vessels for the lower temperature stage can have lighter walls and larger diameters of connecting pipes etc. can be used thereby reducing the weight and price of the apparatus.

Figs. 8 and 9 illustrate a two-stage oven the storage vessels consisting of groups of adjacent tube squares. 13 designates the high pressure accumulator made of five tube squares of small tube diameter; 14 designates the low pressure stage having four adjacent tube squares of larger tube diameter. The baking oven 12 is within the opening of both accumulators. The oven is insulated by the insulation material 15. Since part of the oven is operated at low temperature the heat losses are small and it is obvious that an oven according to my invention is efficient, light and easy to manufacture, has a great heat storage capacity and requires only a small capacity of the connecting gas or electric main which, in the case of the ordinary type of kitchen oven without heat storage provisions must be large enough to meet the maximum demand.

The supply of heat to the heating devices 16 and 17 of the separate accumulators 13 and 14 is separate for each accumulator and is automatically interrupted as soon as the temperature or pressure of the individual accumulator reaches a predetermined value. In this way the temperature or pressure of the individual stage is prevented from going beyond a desired limit as would be the case, for example, when during the night the accumulators are loaded up with heat from cheap electricity. The oven illustrated is supplied by an electric main 20, the electric current being conducted to the individual heating devices 16 and 17 of the accumulators 13 and 14 via the relays 22 and 23. These relays are operated for example by bent tubes 24 and 25 as used in pressure gauges which are connected to the interior of the accumulators 13 and 14 and are operated by the pressure existing in the interior of these accumulators. Relay 23 is shown open i. e. the current is disconnected and 22 is shown closed i. e. the current is switched on to supply heat to heating device 16 and accumulator 13. In addition a safety valve may be provided in case the pressure operated relays may be out of order.

When using two stages the highest operating temperature of the high temperature stage is advantageously set at approximately 570° F. and that of the low temperature stage at approximately 390° F. During the unloading i. e. cooking periods and at times when there is no heat supply the temperature may gradually go down to approximately 390° F. in the high temperature stage and to 220° F. in the low temperature accumulator and cooker.

If the oven must also produce warm water this is preferably done in a low pressure vessel 18 constituting a third heat accumulating stage and operating at still lower pressure and temperature than the other accumulator vessels. The vessel 18 surrounds the high pressure accumulator on the sides and at the bottom and is heated by radiation from this accumulator. On the outside it is insulated. The cold water supply to the vessel is preferably connected to the lower part of the vessel and the warm water taken from the upper part. Provision of a third accumulator stage in the manner described renders the apparatus still more efficient inasmuch as a large part of the heat otherwise transmitted to the insulation material and radiated to the outside is stored up in the water and used.

As heat accumulating fluid any fluid may be used that has a high specific heat and stores large amounts of heat within the temperature limits as are desired for cooking purposes. It may be said at this point that experience and experiments have shown that the temperatures required for ordinary cooking are not as high as usually believed and are well within the range of the above mentioned temperatures. Burners supplying the heat at much higher temperatures naturally cause great heat losses as most of the heat is not transferred to the matters to be cooked but radiated and conveyed to the surrounding air. Distilled water having a very high specific heat, being cheap and storing a great amount of heat within the desired temperature limits at pressures which can be easily handled in closed containers of the type described is a preferred heat storage fluid. Since I propose to evacuate the vessel, no corrosion of the inside of the storage vessel takes place; besides, the heat storage capacity is increased and the heat transmission improved. Only one filling is required once and for all since the vessels are entirely closed. The amount of water to be filled into the vessels is such that when the accumulators are loaded up to their highest capacity i. e. temperature and pressure the water fills the whole vessel and the water volume is equal to the entire volume of the vessel. Only a very small steam space may be left. As soon as heat is withdrawn for example by placing a cooker, a boiling pot or the like on the storage vessel or on the cooking plate 5 or 10, the steam space is increased. The cooking plates are always arranged at the highest point of the storage vessel which point is adjacent to the steam space. The steam will then be condensed at the interior wall of the part of the vessel adjacent to the cooking plate. This is essential as it is well known that the heat transmission from condensing steam to a surface to be heated is much greater than that of pure steam or water which is in contact with a surface to be heated. On the other side, the steam space must be as small as possible because water stores a much greater amount of heat per volume and weight unit than steam and because it is desired to obtain as much high heat storage capacity as possible from the vessel.

Filling and evacuation of the vessel may be done in the following manner. Cold distilled water is filled into the vessel until it is entirely full. The vessel is then heated and the expanding surplus water is permitted to escape through a safety valve temporarily attached and set for the highest operating pressure of the accumulator vessel. This safety valve is then taken off and the vessel sealed by a plug or welding up of the remaining opening. Instead of the safety valve a small opening may be left in the vessel as exit for the expanding water and this opening is sealed as soon as the water in the vessel is heated up to a temperature approximately corresponding to the highest operating pressure of the accumulator.

I wish it to be understood that I do not desire to be limited to the exact details of process, design and construction shown and described, for obvious modifications will occur to a person skilled in the art.

What I claim is:

1. In a cooking machine, a permanently sealed container containing a medium of high heat storage capacity, heating means adapted to supply heat to said container, said container consisting of a plurality of individual hollow elements, the interior of said individual elements being interconnected for intercommunication of said heat storage medium within said individual elements, and a cooking plate directly connected to the upper portion of all of said individual elements and adapted to collectively receive heat from all of said elements.

2. In a cooking machine, a heating device, a permanently sealed container containing a medium of high heat storage capacity, said heating device being directly connected to said container, said container consisting of a plurality of individual elements, and a cooking plate directly associated with the upper portion of all of said individual elements and being adapted to collectively receive heat from all of said elements.

3. In a cooking machine, a plurality of individual permanently sealed heat accumulating containers built for different internal pressures and containing fluids under pressure having high heat storage capacity, a plurality of individual heat supply means directly and individually associated with said individual containers and adapted to directly and individually supply different amounts of heat to said individual containers, and cooking means directly and individually connected with and adapted to directly receive heat from said containers, said individual containers being individually built for and operating at different pressures and temperatures and constituting a plurality of different temperature heat accumulator stages.

4. In a high capacity cooking machine, a source of heat, a cooking plate, and a permanently sealed container, said source of heat and said cooking plate being connected to said container so as to permit a flow of heat from said source into said container and therefrom to said cooking plate, said container being evacuated and filled with water, whereby only a very small space is left within said container permitting the generation of saturated steam and superheating of the steam is definitely prevented, said cooking plate being adjacent to the small space in which saturated steam is generated which condenses on said cooking plate whenever a relatively cold article is placed upon said plate.

5. In a high capacity cooking machine, a permanently sealed container having an upper and a lower part, a liquid of high heat storage capacity within said container leaving only a small vapor space at the uppermost part of said container, a steam condensing surface within the uppermost part of said container, a cooking plate directly associated with the steam condensing surface, and a source of heat associated with the lower part of said container.

6. In a cooking machine, a plurality of individual permanently sealed heat accumulating containers built for different internal pressures and containing fluids under pressure having high heat storage capacity, a plurality of individual heat supply devices directly and individually associated with said individual containers and adapted to directly and individually supply different amounts of heat to said individual containers, and cooking means directly associated with and adapted to directly receive heat from said containers, said individual containers individually operating at different pressures and temperatures and constituting a plurality of different temperature heat accumulator stages, and a vessel surrounding said containers adapted to absorb the heat radiating from said containers and constituting an additional heat accumulator stage operating at a temperature different from those of said containers.

7. In a cooking machine, a plurality of individual entirely closed heat accumulating containers built for different internal pressures and containing fluids under pressure having high heat storage capacity, a plurality of individual heat supply devices directly and individually associated with said individual containers and adapted to directly and individually supply different amounts of heat to said individual containers, and cooking means directly associated with and adapted to directly receive heat from said containers, said individual containers individually operating at different pressures and temperatures and constituting a plurality of different temperature heat accumulator stages, and a vessel surrounding that one of said containers which operates at highest pressure, said vessel being adapted to absorb the heat radiating from said container which operates at highest pressure and constituting an additional heat accumulator stage operating at a temperature different from those of said containers.

8. In a cooking stove, a permanently sealed pressure vessel which is partially filled with a liquid of high heat storage capacity leaving a space in the upper portion of said vessel which is filled with vapor of said liquid, heat supply means connected to said vessel, heat transfer means connected to the upper portion of said vessel and receiving heat from the vapor which fills the upper portion of said vessel and condenses immediately adjacent to said heat transfer means.

9. In a cooking stove, a permanently sealed pressure vessel which is partially filled with a liquid of high heat storage capacity leaving a space in the upper portion of said vessel which is filled with vapor of said liquid, heat supply means connected to said vessel, heat transfer means connected to the upper portion of said vessel and having a heat transmitting cooking surface which is located above the level of the liquid contained in said vessel and receives heat from the vapor which fills the upper portion of said vessel and condenses immediately adjacent to said heat transfer means.

10. In a cooking stove, a permanently sealed pressure vessel partially filled with liquid of high heat storage capacity leaving a space associated with said vessel which under normal operating conditions is filled with vapor of said liquid, said liquid amounting to at least 50% of the capacity of said vessel, heat supply means associated with said vessel, and heat transfer means associated with the upper portion of said vessel and receiving heat from the vapor which fills the upper portion of said vessel and condenses immediately adjacent to said heat transfer means.

11. In a high capacity cooking stove, a source of heat, a cooking plate, and a permanently sealed container, said source of heat and said cooking plate being connected to said container so as to permit a flow of heat from said source into said container and therefrom to said cooking plate, said container being evacuated and filled with water to at least 50% of the capacity of said container, whereby only a relatively small space is left within said container permitting the generation of saturate steam and superheating of the steam is definitely prevented, said cooking plate being adjacent to the small space in which saturated steam is generated and condensed on said cooking plate whenever a relatively cold article is placed upon said plate.

PAUL SPIESS.